United States Patent Office 3,564,565 Patented Feb. 16, 1971

3,564,565

PROCESS FOR ADHERENTLY APPLYING BORON NITRIDE TO COPPER AND ARTICLE OF MANUFACTURE

Rolf R. Haberecht, Richardson, and Robert J. Patterson, Dallas, Tex., assignors to Texas Instruments Incorporated, Dallas, Tex., a corporation of Delaware No Drawing. Filed May 5, 1964, Ser. No. 365,153
Int. Cl. C23b *5/52*; C23c *11/00*
U.S. Cl. 29—195 62 Claims

ABSTRACT OF THE DISCLOSURE

Disclosed is a process for adherently depositing a film of boron nitride directly upon the surface of a substrate consisting primarily of copper or copper alloy, comprising the steps of first degenerating the surface of the substrate by the interspersion of foreign atoms into the lattice structure of the copper, and then depositing a film of boron nitride on the degenerated surface.

The present invention relates generally to insulated electrical conductors, and in particular relates to a process for adherently depositing a thin, dense, insulating film of boron nitride on copper and copper alloys, including dispersion-hardened copper alloys, and to the resulting product.

At present, most materials used to insulate copper are not satisfactory where prolonged operation at temperatures of 150° C. or greater is required, particularly where space is at a premium as in motor and transformer windings. Most of the insulating materials are not adequately adherent to the copper and are not sufficiently flexible. Further, the insulating materials usually have unacceptable porosities when fabricated in thin film form of less than 1.0 mil thick. Organic insulating materials tend to fail as a result of decomposition and volatilization if operated at elevated temperatures over long periods of time. Inorganic insulations tend to be more stable at elevated temperatures, but are usually difficult to prepare without pinholes, usually crack on bending, and usually must be coated over with a second material to protect them from moisture and cracking.

Boron nitride is noted for its dielectric properties and is highly resistant to most chemically corrosive agents and to oxidation, even at elevated temperatures. However, boron nitride has not heretofore been used as an insulation for copper or copper alloy conductors because the boron ritride could not readily be made adherent to the surface of the copper as a thin, continuously dense and pinhole-free film.

The present invention provides a process for adherently depositing substantially pure boron nitride directly upon the surface of a substrate consisting primarily of copper or copper alloy. The process entails first degenerating the surface of the substrate by the interspersion of foregin atoms into the lattice structure of the copper to alter the lattice structure of the surface zone such that the boron nitride will tenaciously bond directly to the surfaces. The foreign atoms may be interspersed by diffusion of minute quantities into the surface zone of the copper where they are incorporated either interstitially or substitutionally. A thin, dense, continuous film of substantially pure boron nitride may then be adherently deposited directly on the degenerated surface by the pyrolysis of trichloroborazole or other suitable reactant containing boron and nitrogen, or other suitable process.

More specifically, the surface of the copper can be degenerated by diffusing one or more foreign elements into the surface zone of the copper taken from the group consisting of vanadium, chromium, manganese, iron, nickel, silicon, germanium, silver, gold, aluminum, phosphorus, cobalt, arsenic, antimony, titanium, zinc, niobium, molybdenum, ruthenium, rhodium, palladium, tantalum, tungsten, rhenium, osmium, iridium, platinum, hydrogen, nitrogen, boron and carbon.

The diffusion may be accomplished from a solid, liquid or vapor diffusion source. For example, the foreign material in bulk form may be placed in intimate contact with the surface of the substrate and the two materials heated to an elevated temperature for a predetermined period until the desired diffusion gradient is establshed in the surface zone of the substrate. Then the excess foreign material is removed from the surface of the substrate to expose the degenerated surface and the boron nitride deposited on the surface by the pyrolysis of a boron and nitrogen-bearing reactant stream. Or a measured quantity of the foreign material may be placed on the surface so that the diffusion source will be expended at the moment when the copper substrate surface zone has been degenerated to the desired degree. In this case no excess foreign material remains on the surface of the substrate. The diffusion may also be carried out by immersing the surface of the substrate at an elevated temperature in one or more of the foreign elements until the desired degree of degeneration has been accomplished.

The article of manufacture resulting from the process of the present invention is comprised of a copper or copper alloy substrate having a degenerated surface zone to which a thin film of essentially pure, continuously dense boron nitride is adherently bonded.

Therefore, an important object of the present invention is to provide a process for adherently depositing a thin, dense, pinhole-free, substantially pure insulating film of boron nitride directly upon the surface of a copper or copper alloy substrate upon which the boron nitride could not otherwise be adherently deposited.

Yet another object of this invention is to provide a process for mainufacturing an insulated copper conductor having a minimum diameter for a given effective conductive path.

Another object is to provide an insulated copper conductor which may be operated for prolonged periods of time at elevated temperatures.

A still further object of the present invention is to provide an insulated copper conductor which can be used in corrosive environments or in vacuums for prolonged periods of time.

Another object of the invention is to provide an insulated copper or copper alloy conductor of the type described which is particularly suited for use in transformer and motor windings wherein the conservation of space is an important factor.

Many additional objects and advantages of the present invention will be evident to those skilled in the art from the following detailed description and appended claims.

The process of the present invention is applicable to substrates comprised primarily of pure copper, or to one comprised primarily of most copper alloys, including the dispersion-hardened coppers, which have been developed to improve the various physical properties of pure copper, such as tensile strength at higher temperatures. In general, these coppers have lower conductivity than pure copper, but have other properties necessary for specific applications. Therefore, when reference is hereafter made to copper, a copper substrate or to a substrate, it is to be understood that the term is intended to include pure copper and the various copper alloys which are predominantly copper.

In accordance with the present invention, the surface zone of a copper or copper alloy substrate is first degenerated or degraded by diffusion of relatively minute quantities of impurities into the surface zone of the substrate. The atoms of the foreign material may be dispersed between the existing atoms of the copper lattice structure, or may occupy lattice sites of the normal copper lattice, or both. In the former case where the foreign atoms are disposed between the copper atoms in the normal lattice, the surface zone may be considered as interstitially degenerated. In the case where the foreign atoms are incorporated in the lattice structure at the normal lattice sites, the surface zone may be considered substitutionally degenerated. The degeneration of the surface zone by either or a combination of the two forms results in a change in the lattice parameters of the substrate such as, for example, the lattice constant, thermal expansivity, and chemical affinity. In most cases this permits the subsequent deposition and intimate bonding of boron nitride directly on the degenerated surface.

In accordance with the present invention, the term degeneration is intended to include both the interstitial and substitutional placement of foreign atoms in the lattice structure, as well as the introduction of surface lattice defects by the interspersion of foreign atoms, any one of which, or combinations of which, will tend to vary the character of the surface zone of the substrate in such a manner that a boron nitride film can be adherently deposited directly on the degenerated surface. The concentration of foreign atoms should exceed about $10^{17}$ atoms per cubic centimeter in the surface zone and in particular at the surface.

In general, the foreign materials which may be used in the degeneration process are limited by the size of the atoms of the material, the electronegativity of the material as compared with that of copper, and the other factors generally affecting solid state solutions. The elements which are more easily handled, more plentiful, and more economical are preferred including vanadium, chromium, manganese, iron, nickel, silicon, germanium, silver, gold, aluminum and phosphorus. However, other elements having atom sizes compatible with the copper lattice and which may be used to degenerate the surface zone of the substrate are cobalt, arsenic, antimony, titanium, zinc, niobium, molybdenum, ruthenium, rhodium, palladium, tantalum, tungsten, rhenium, osmium, iridium and platinum. The atoms of these elements tend to replace the existing atoms of copper in the lattice structure to produce substitutional degeneration. In general, only elements having an atom size less than the interstitial spacing between the copper atoms of the copper lattice can be diffused into the surface of the copper and assume an interstitial position. Therefore, hydrogen, boron, nitrogen and carbon can be used to produce interstitial degeneration of the surface zone of the substrate.

The surface zone of the substrate may be degenerated by placing the foreign material, i.e., one or more of the elements heretofore specified, in intimate contact with the surface of the substrate to be degenerated and heating the substrate and the foreign material to an elevated temperature for a period of time to cause the diffusion and interspersion of the atoms of the foreign material into the lattice structure of the substrate in the zone adjacent the surface. In general, the degenerated zone should be maintained as thin as possible and still obtain the desired concentration of foreign atoms because the degeneration adversely affects the conductivity of the substrate. The diffusion source is then removed from the substrate to expose the degenerated surface, and a thin film of the boron nitride is deposited directly on the degenerated surface by the pyrolysis of trichloroborazole or other suitable boron and nitrogen-bearing material.

In accordance with a more specific aspect of the invention, the foreign material may be placed in intimate contact with the surface of the substrate by depositing a film of the material on the surface by conventional physical evaporation techniques, cathodic sputtering techniques, electrochemical deposition techniques, or chemical vapor-deposition techniques. Or the film of material may be applied by mechanical techniques such as painting and spraying the surface, or by pressing bulk solids into intimate contact with the surface. An excess of foreign material may be applied so as to provide an unlimited diffusion source, or a measured quantity of the foreign material may be placed on the substrate surface so that all of the material is diffused into the substrate as will presently be described so as to produce the desired concentration of foreign material to properly degenerate the surface zone.

After the foreign material has been deposited by one of the above techniques, a thin film of the foreign material will be disposed in intimate contact with the surface of the copper substrate. The surface zone of the substrate will then have a concentration gradient to an exceedingly shallow depth, being at most only several atoms in thickness from the interface between the copper substrate and the foreign material. The depth of penetration and the concentration gradient of the foreign material over this depth will vary to an appreciable degree at this stage of the process depending upon the temperature to which the substrate and the foreign material are heated by the particular process used to apply the foreign material to the surface of the substrate.

The substrate and foreign material are then heated to an elevated temperature in order to accelerate the diffusion of the foreign material into the copper substrate, and the elevated temperature is maintained until the concentration of foreign atoms in the surface zone of the substrate is at the desired level. The temperature and duration of the diffusion step will vary appreciably depending upon the foreign material being diffused into the substrate, but in general, the higher the temperature the shorter the period of time required for a given material.

If an excess of foreign material has been applied to the surface of the substrate, the excess is removed to expose the degenerated surface of the substrate by any suitable technique such as evaporation, grinding or abrading, dissolution, or sputtering, in which case the substrate would be made the cathode. If only a measured quantity of foreign material has been deposited on the surface, all of the foreign material will be diffused into the substrate or into the adjacent environment so that the degenerated surface will be exposed. After the diffusion step, the concentration of the foreign material in the surface zone will be at a higher level and will have a lower gradient over the diffused zone. As mentioned, it is desirable to maintain the thickness of the degenerated surface zone and the concentration level at depth to a minimum so that the electrical conductivity of the major portion of the copper substrate will not be materially affected. Therefore the process for removing the excess material should be chosen so as to minimize further diffusion of the foreign material into the substrate, unless the degree of diffusion which will result during the removal process is taken into account. If necessary or desirable, the substrate may be further subjected to heat treatment to evaporate the foreign material from the copper lattice structure and bring the ratio of foreign atoms to copper atoms in the surface zone within the desired range for bonding of the boron nitride.

In accordance with another important aspect of the present invention, the foreign material may be placed in intimate contact with the substrate surface and the foreign material diffused into the substrate by immersing the heated substrate into a molten or vapor bath of the foreign material for a period of time. Or the heated substrate surface may be disposed in a plasma of one or more of the above specified metals until the desired degree of diffusion has been accomplished. Any excess foreign material remaining on the surface of the substrate may then be removed to leave the degenerated substrate surface exposed.

A thin film of boron nitride is then adherently deposited on the degenerated surface of the substrate. This may be accomplished by placing the substrate in a vacuum reaction chamber which is then evacuated to a low pressure of about one micron of mercury and backfilled with beta-trichloroborazole vapors to a pressure between about 10 and about 300 microns of mercury. The substrate is then heated to a temperature in the range from about 700° C. to about 1050° C. until a film of boron nitride of the desired thickness is formed by the pyrolysis of the beta-trichloroborazole. The thickness of the film can be rather precisely controlled by controlling the various parameters of pressure, temperature and contact time between the vapors and the substrate. Boron nitride films from 0.2 micron to at least 5.0 microns can be prepared as desired. Other reactant vapors containing boron and nitrogen such as boron trichloride and ammonia may be used instead of the trichloroborazole to carry out the process.

In a specific example of the process of the present invention, a thin layer of manganese was deposited on the surface of a copper substrate using conventional and well-known evaporation and condensation techniques. The substrate was then heated in a vacuum for one hour at approximately 700° C. to diffuse the manganese into the surface zone of the copper substrate. The excess manganese remaining on the surface of the copper substrate was then re-evaporated by raising the temperature of the substrate to approximately 850° C. This exposed the surface of the substrate which was degenerated by a small quantity of impurity atoms of manganese diffused into the surface zone of the substrate. No compound formation was detected by X-ray defraction examination. A thin film of boron nitride was then deposited on the degenearted surface by the pyrolysis of trichloroborazole at 900°–1000° C. The resulting deposit was adherent to the degenerated copper surface as evidenced by bending tests. The film was on the order of several microns in thickness and was insulated to about 230 volts breakdown. The insulation resistance of the boron nitride film was above $10^9$ ohms.

In general, boron nitride insulation films prepared by the above process are strongly adherent to the substrate and are sufficiently flexible that coated copper wire may be used for many conventional purposes. The substrate where coated and protected by boron nitride is chemically stable in a wide variety of corrosive media. Specifically, the boron nitride films are insoluble in and protect the substrate in the presence of $H_2O$, HCl (dilute and concentrated), $HNO_3$ (dilute and concentrated), $H_2SO_4$ (dilute and concentrated), aqua regia, NaOH, KOH (dilute and concentrated), cryolite mixtures, and HF (dilute and concentrated). The boron nitride films are stable in air up to 700° C., but are unstable above 800° C. after 30 minutes. Negligible loss of boron nintride by evaporation occurs when the film is held at 900° C. in a vacuum of 0.01 micron of mercury.

From the above detailed description of the present invention, it will be evident that a process has been described for adherently bonding directly to the surface of a substrate comprised primarily of copper a thin, electrically-insulating film of boron nitride that is free from binder additives common to other forms of boron nitride The copper substrate coated with boron nitride film is highly useful as an insulated electrical conductor and may be used in many adverse environments in which copper conductors cannot presently be used, such as at elevated temperatures in corrosive and oxidizing environments, and even in space vacuums. The very thin insulation films nevertheless provide a high degree of insulation with a significant saving in the overall space required for motor and transformer windings and the like.

Although the preferred embodiment of the invention has been described in detail, it is to be understood that various changes, substitutions and alterations can be made therein without departing from the spirit and scope of the invention as defined by the appended claims.

What is claimed is:

1. A process for adherently depositing a thin film of dense, electrically-insulating boron nitride on the surface of a copper or copper alloy substrate comprising the steps of:

vapor-depositing a film of manganese on the surface of the substrate;

heating the substrate and film in a vacuum to an elevated temperature for a period of time to cause diffusion of a portion of the manganese into the surface zone of the substrate;

heating the substrate and manganese in a vacuum to a sufficiently high temperature to cause evaporation of the residual manganese not diffused into the surface zone of the substrate and leave a degenerated substrate surface zone exposed; and depositing a thin film of boron nitride on the degenerated surface by the pyrolysis of a reactant vapor containing boron and nitrogen.

2. A process for adherently depositing a thin film of dense, electrically-insulating boron nitride on the surface of a copper or copper alloy substrate comprising the steps of:

degenerating the surface zone of the substrate by interspersing in the lattice structure of the substrate at the surface to a concentration in excess of $10^{17}$ atoms per cubic centimeter one or more materials taken from the group consisting of vanadium, chromium, manganese, iron, nickel, silicon, germanium, silver, gold, aluminum, and phosphorus; and depositing a film of boron nitride on the degenerated surface by the pyrolysis of a reactant vapor containing boron and nitrogen.

3. A process as defined in claim 2 wherein the material is vanadium.

4. A process as defined in claim 2 wherein the material is chromium.

5. A process as defined in claim 2 wherein the material is manganese.

6. A process as defined in claim 2 wherein the material is iron.

7. A process as defined in claim 2 wherein the material is nickel.

8. A process as defined in claim 2 wherein the material is silicon.

9. A process as defined in claim 2 wherein the material is germanium.

10. A process as defined in claim 2 wherein the material is silver.

11. A process as defined in claim 2 wherein the material is gold.

12. A process as defined in claim 2 wherein the material is aluminum.

13. A process as defined in claim 2 wherein the material is phosphorus.

14. A process for adherently depositing a thin film of dense, electrically-insulating boron nitride on the surface of a copper or copper-alloy substrate comprising the steps of:

degenerating the surface zone of the substrate by interspersing in the lattice structure of the substrate at the surface to a concentration in excess of $10^{17}$ atoms per cubic centimeter, one or more materials taken from the group consisting of cobalt, arsenic, antimony, titanium, zinc, niobium, molybdenum, ruthenium, rhodium, palladium, tantalum, tungsten, rhenium, osmium, iridium, platinum, and carbon; and depositing a film of boron nitride on the degenerated surface by the pyrolysis of a reactant vapor containing boron and nitrogen.

15. A process as defined in claim 14 wherein the material is cobalt.

16. A process as defined in claim 14 wherein the material is arsenic.

17. A process as defined in claim 14 wherein the material is antimony.

18. A process as defined in claim 14 wherein the material is titanium.

19. A process as defined in claim 14 wherein the material is zinc.

20. A process as defined in claim 14 wherein the material is niobium.

21. A process as defined in claim 14 wherein the material is molybdenum.

22. A process as defined in claim 14 wherein the material is ruthenium.

23. A process as defined in claim 14 wherein the material is rhodium.

24. A process as defined in claim 14 wherein the material is palladium.

25. A process as defined in claim 14 wherein the material is tantalum.

26. A process as defined in claim 14 wherein the material is tungsten.

27. A process as defined in claim 14 wherein the material is rhenium.

28. A process as defined in claim 14 wherein the material is osmium.

29. A process as defined in claim 14 wherein the material is iridium.

30. A process as defined in claim 14 wherein the material is platinum.

31. A process as defined in claim 14 wherein the material is carbon.

32. An article of manufacture comprising a substrate comprised primarily of copper having a surface degenerated by the presence of relatively minute quantities of foreign elements having atoms of sufficient size to fit into the lattice structure of the substrate at the surface, said foreign elements selected from one or more members of the group consisting of vanadium, chromium, manganese, iron, nickel, silicon, germanium, silver, gold, aluminum, and phosphorus, and a thin film of continuously dense boron nitride adherently bonded to the surface by the pyrolysis of a reactant vapor containing boron and nitrogen.

33. An article of manufacture as defined in claim 32 wherein the material is vanadium.

34. An article of manufacture as defined in claim 32 wherein the material is chromium.

35. An article of manufacture as defined in claim 32 wherein the material is manganese.

36. An article of manufacture as defined in claim 32 wherein the material is iron.

37. An article of manufacture as defined in claim 32 wherein the material is nickel.

38. An article of manufacture as defined in claim 32 wherein the material is silicon.

39. An article of manufacture as defined in claim 32 wherein the material is germanium.

40. An article of manufacture as defined in claim 32 wherein the material is silver.

41. An article of manufacture as defined in claim 32 wherein the material is gold.

42. An article of manufacture as defined in claim 32 wherein the material is aluminum.

43. An article of manufacture as defined in claim 32 wherein the material is phosphorus.

44. An article of manufacture comprising a substrate comprised primarily of copper having a surface degenerated by the presence of relatively minute quantities of foreign elements having atoms of sufficient size to fit into the lattice structure of the substrate at the surface, said foreign elements selected from one or more members of the group consisting of cobalt, arsenic, antimony, titanium, zinc, niobium, molybdenum, ruthenium, rhodium, palladium, tantalum, tungsten, rhenium, osmium, iridium, platinum, and carbon, and a thin film of continuously dense boron nitride adherently bonded to the surface by the pyrolysis of a reactant vapor containing boron and nitrogen.

45. An article of manufacture as defined in claim 44 wherein the material is cobalt.

46. An article of manufacture as defined in claim 44 wherein the material is arsenic.

47. An article of manufacture as defined in claim 44 wherein the material is antimony.

48. An article of manufacture as defined in claim 44 wherein the material is titanium.

49. An article of manufacture as defined in claim 44 wherein the material is zinc.

50. An article of manufacture as defined in claim 44 wherein the material is niobium.

51. An article of manufacture as defined in claim 44 wherein the material is molybdenum.

52. An article of manufacture as defined in claim 44 wherein the material is ruthenium.

53. An article of manufacture as defined in claim 44 wherein the material is rhodium.

54. An article of manufacture as defined in claim 44 wherein the material is palladium.

55. An article of manufacture as defined in claim 44 wherein the material is tantalum.

56. An article of manufacture as defined in claim 44 wherein the material is tungsten.

57. An article of manufacture as defined in claim 44 wherein the material is rhenium.

58. An article of manufacture as defined in claim 44 wherein the material is osmium.

59. An article of manufacture as defined in claim 44 wherein the material is iridium.

60. An article of manufacture as defined in claim 44 wherein the material is platinum.

61. An article of manufacture as defined in claim 44 wherein the material is boron.

62. An article of manufacture as defined in claim 44 wherein the material is carbon.

References Cited

UNITED STATES PATENTS

| | | | |
|---|---|---|---|
| 2,748,030 | 5/1956 | Silvershei et al. | 117—161 |
| 3,029,162 | 4/1962 | Samuel et al. | 117—107 |
| 3,152,006 | 10/1967 | Bashe | 117—106 |
| 3,212,926 | 10/1965 | Morelock | 117—106X |
| 3,321,337 | 5/1967 | Patterson | 148—6.3 |

FOREIGN PATENTS

| | | | |
|---|---|---|---|
| 357,510 | 9/1931 | Great Britain | 117—Boron dig |
| 663,377 | 12/1951 | Great Britain | 148—6.3 |
| 851,208 | 10/1960 | Great Britain | 148—6.3 |
| 1,092,271 | 11/1960 | Germany | 117—106 |
| 1,275,382 | 9/1961 | France | 117—106 |

OTHER REFERENCES

Powell et al., Vapor Plating, 1955, pp. 15, 95 to 101 relied upon.

ALFRED L. LEAVITT, Primary Examiner

J. R. BATTEN, Jr., Assistant Examiner

U.S. Cl. X.R.

29—199; 117—102, 106, 107, 215, 216, 217, Digest 16; 204—37, 38, 192